(12) United States Patent
Postler

(10) Patent No.: US 7,644,958 B2
(45) Date of Patent: Jan. 12, 2010

(54) COMPRESSION FITTING FOR A HEATING AND/OR SANITARY PIPE

(75) Inventor: Stefan Postler, Gossmannsdorf (DE)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 11/914,423

(22) PCT Filed: Mar. 3, 2006

(86) PCT No.: PCT/EP2006/060447

§ 371 (c)(1),
(2), (4) Date: Jan. 31, 2008

(87) PCT Pub. No.: WO2006/097409

PCT Pub. Date: Sep. 21, 2006

(65) Prior Publication Data

US 2008/0191475 A1   Aug. 14, 2008

(30) Foreign Application Priority Data

Mar. 14, 2005 (DE) ........................ 10 2005 011 958

(51) Int. Cl.
*F16L 33/00* (2006.01)
(52) U.S. Cl. .................... 285/249; 285/250; 285/23
(58) Field of Classification Search ................ 285/249, 285/334.2, 248, 250, 23

See application file for complete search history.

(56) References Cited

U.S. PATENT DOCUMENTS 3,685,860 A * 8/1972 Schmidt .................... 285/249

(Continued)

FOREIGN PATENT DOCUMENTS

DE    93 15 601.4 U1    4/1994

(Continued)

OTHER PUBLICATIONS

Translation of the International Preliminary Report on Patent and the Written Opinion, dated Oct. 11, 2007 for International Application No. PCT/EP2006/060447, 7 pgs.

(Continued)

*Primary Examiner*—David E Bochna
(74) *Attorney, Agent, or Firm*—Shumaker & Sieffert, P.A.

(57) ABSTRACT

The compression fitting (10) for a heating and/or sanitary pipe comprises a fitting body (12) including a supporting sleeve (16) adapted to have a pipe end (66) slid thereonto, and a conical abutment face (20). The compression fitting (10) further comprises a complementary part (24) for the fitting body (12), which is provided with a conical receiving face (22) for abutment by the abutment face (20) of the fitting body (12). The compression fitting (10) is provided with a clamping ring (40) encompassing the pipe end (66) which can be slid on the supporting sleeve (16), and with a lock nut (42) having an inner thread (44) and being adapted to be screwed to the complementary part (24), for pressing the clamping ring (40) against the fitting body (12) and for clamping abutment on the pipe end (66) in the condition when the pipe end has been slid onto the supporting sleeve (16). The fitting body (12) comprises radially protruding fixing projections (46) for axially fixing the fitting body (12) inside the lock nut (42) to the inner thread (44) or to other internal face structures thereof, to prevent the lock nut (42) from being inadvertently detached before it is screwed to the complementary part (24).

7 Claims, 4 Drawing Sheets

U.S. PATENT DOCUMENTS

Figure 1:
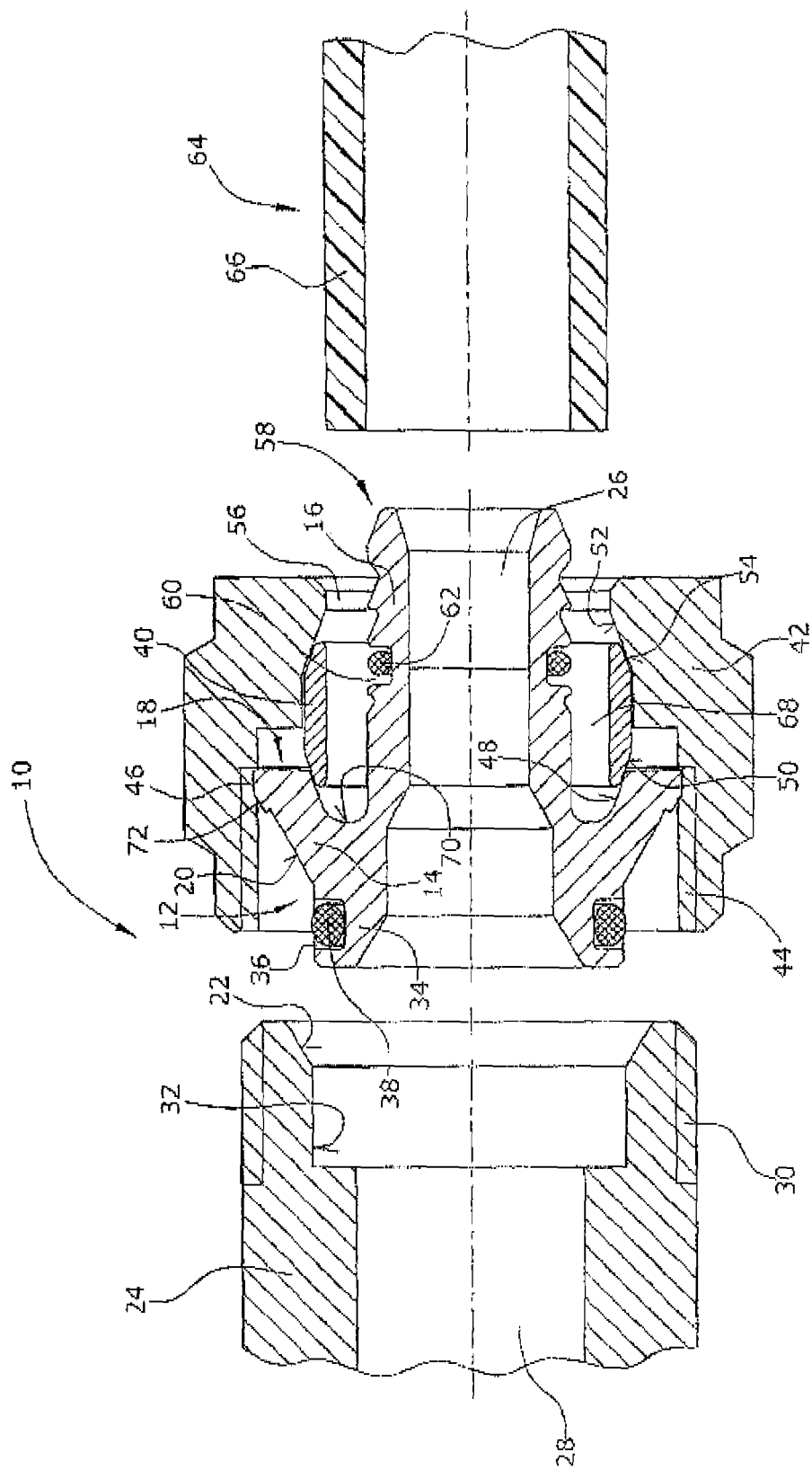

| | | | |
|---|---|---|---|
| 3,830,531 A | | 8/1974 | Burge |
| 4,452,473 A | * | 6/1984 | Ruschke ........................ 285/81 |
| 4,614,372 A | * | 9/1986 | Gschwind .................... 285/250 |
| 5,340,162 A | * | 8/1994 | Prendel et al. ................. 285/23 |
| 7,270,349 B2 | * | 9/2007 | Bamberger et al. .......... 285/249 |
| 7,469,936 B2 | * | 12/2008 | Norman ....................... 285/249 |

FOREIGN PATENT DOCUMENTS

| | | |
|---|---|---|
| DE | 197 52 528 A1 | 6/1998 |
| DE | 199 34 093 A1 | 1/2001 |
| DE | 203 13 506 U1 | 12/2003 |

OTHER PUBLICATIONS

International Search Report dated May 11, 2006, for corresponding PCT Application No. PCT/EP2006/060447, 3 pgs.

\* cited by examiner

COMPRESSION FITTING FOR A HEATING AND/OR SANITARY PIPE

The invention relates to a compression fitting for a heating and/or sanitary pipe wherein the pipe end is clamped against a supporting sleeve of the fitting body by means of a clamping ring, with the clamping force being generated by screwing a lock nut to a complementary part accommodating the fitting body.

Compression fittings of the above outlined type (partially also referred to as screw fittings) are generally known in the state of the art and are described e.g. in DE 199 34 093 A1 and DE 203 13 506 U1. These fitting comprise the above-mentioned individual components which have to be assembled in situ. This necessitates a relatively bothersome and time-consuming process. Further, a danger exists that component parts of the compression fitting might become lost when the latter is being transported.

It is an object of the invention to provide a compression fitting for a heating and/or sanitary pipe wherein the mounting of the compression fitting to the to-be-connected pipe is simplified.

To achieve the above object, there is proposed, according to the invention, a compression fitting for a heating and/or sanitary pipe, comprising
- a fitting body comprising a supporting sleeve adapted to have a pipe end slid thereonto, and a conical abutment surface,
- a complementary part for the fitting body, which is provided with a conical receiving surface for abutment by the abutment surface of the fitting body,
- a clamping ring encompassing the pipe end which can be slid on the supporting sleeve, and
- a lock nut having an inner thread and being adapted to be screwed to the complementary part, for pressing the clamping ring against the fitting body and for clamping abutment on the pipe end in the condition when the pipe end has been slid onto the supporting sleeve,
- the fitting body comprising radially protruding fixing projections for axially fixing the fitting body inside the lock nut to the inner thread or to other internal surface structures thereof to prevent the lock nut from being inadvertently detached before it is screwed to the complementary part.

In the compression fitting according to the invention, the fitting body with its supporting sleeve and its conical abutment surface and the clamping ring are secured within the lock nut against falling out. This is realized by means of fixing projections radially projecting from the fitting body, cooperating with the inner thread of the lock nut in order to prevent that the fitting body and the clamping ring encompassing the supporting sleeve of the fitting body might undesirably fall out or become detached.

According to an advantageous embodiment of the invention, it is provided that that the fitting body together with its clamping shell and/or the clamping ring comprise a plastic material. Preferably, this plastic material is fiber-reinforced.

According to a further advantageous embodiment of the invention, the conical abutment surface of the fitting body comprises centering projections which serve for adaptation of the complementary part for the fitting body if the conical receiving surface of the complementary part has a cone angle deviating from the cone angle of the abutment surface of the fitting body. The abutment faces, suitably formed as projections in that region which in the condition of abutment of the fitting body to the complementary part is arranged outside the receiving face of the complementary part, are provided to prevent a too deep immersion of the fitting body's abutment face into the conical receiving face of the complementary part. Notably, if the conical abutment face of the fitting body would be immersed too far into the conical receiving face of the complementary part, a danger would arise that the lock nut, by the time it is able to apply the press-on force acting on the clamping ring, would have been screwed to the complementary part already to a point close to its final abutment condition.

According to a further advantageous embodiment of the invention, it is provided that the lock nut and the fitting body comprise conical press-on faces configured to cooperate with oblique faces on the axial ends of the clamping ring and that the cone angle of the press-on face of the fitting body is smaller than that of the press-on face of the lock nut. In this manner, there is accomplished a well-aimed deformation of the clamping ring and the pipe in the pressed condition of the pipe, resulting in protection from axial pulling forces and in a reliable sealing of the connection end of the pipe on the supporting sleeve.

Further, the supporting sleeve can comprise at least one circumferential groove having a sealing element accommodated therein for sealing abutment on the inner face of the to-be-connected pipe end. It can also be provided that a sealing element accommodated by a circumferential groove is arranged at the tapered cone end of the fitting body or within a portion of the fitting body adjoining the tapered cone end of the fitting body.

Figure 2:
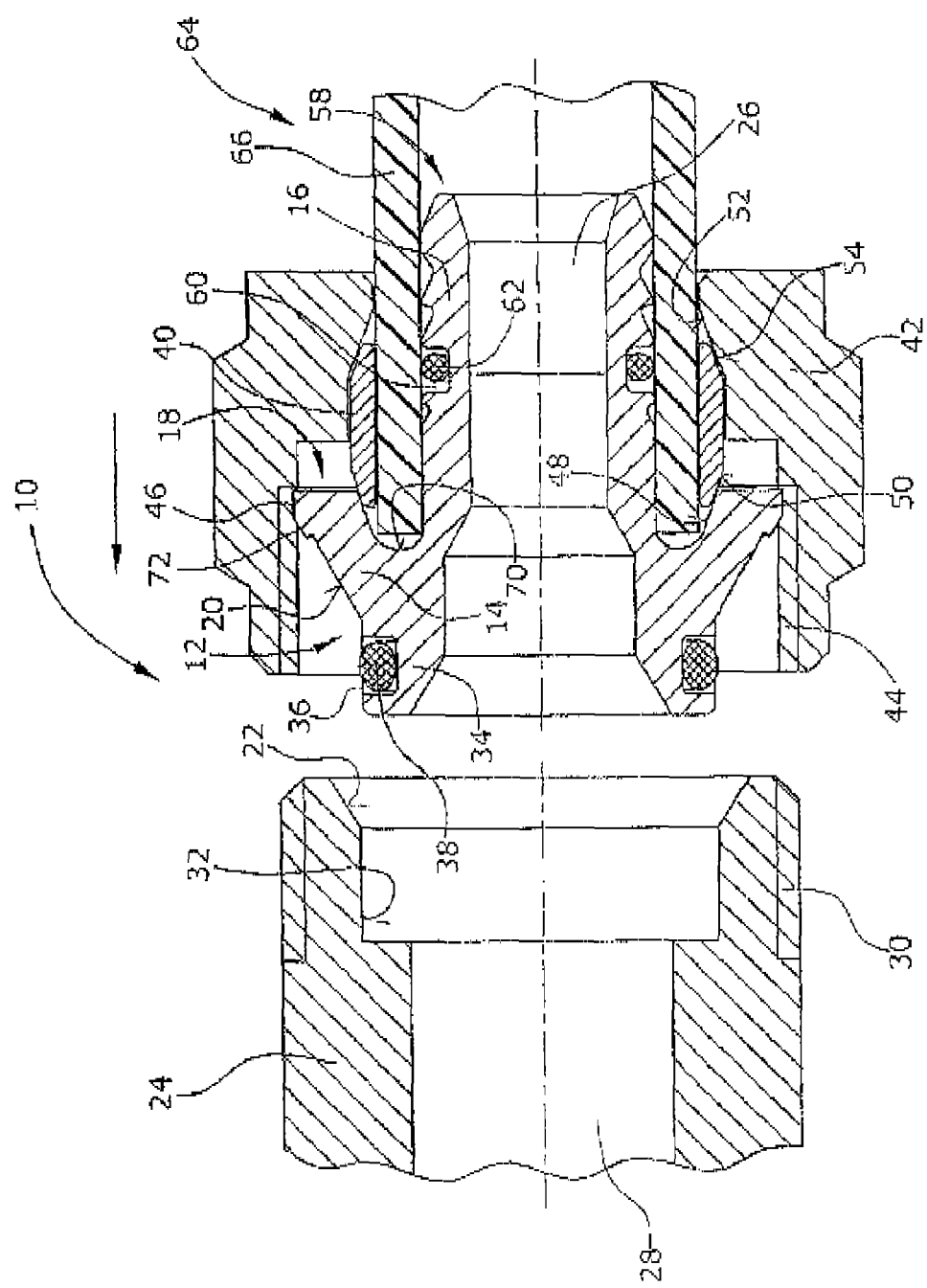
Figure 3:
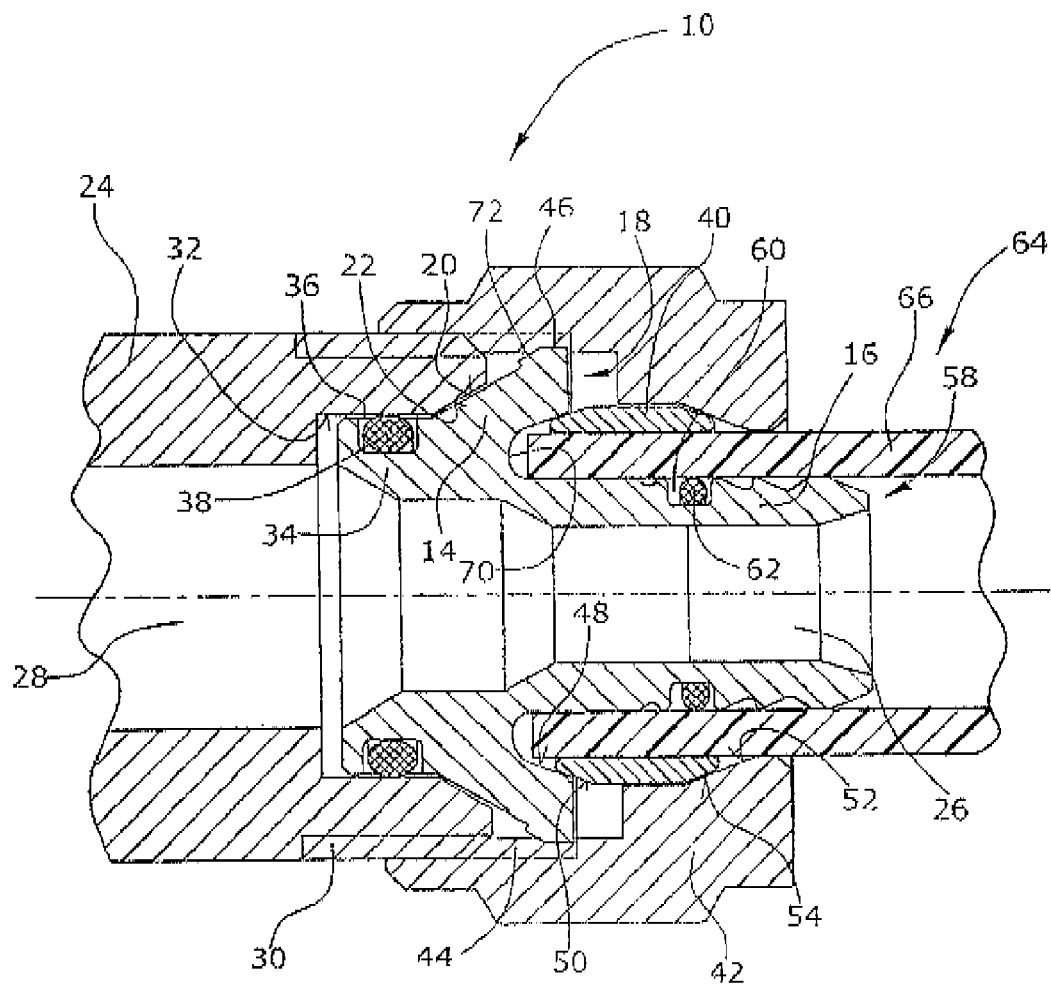
Figure 4:
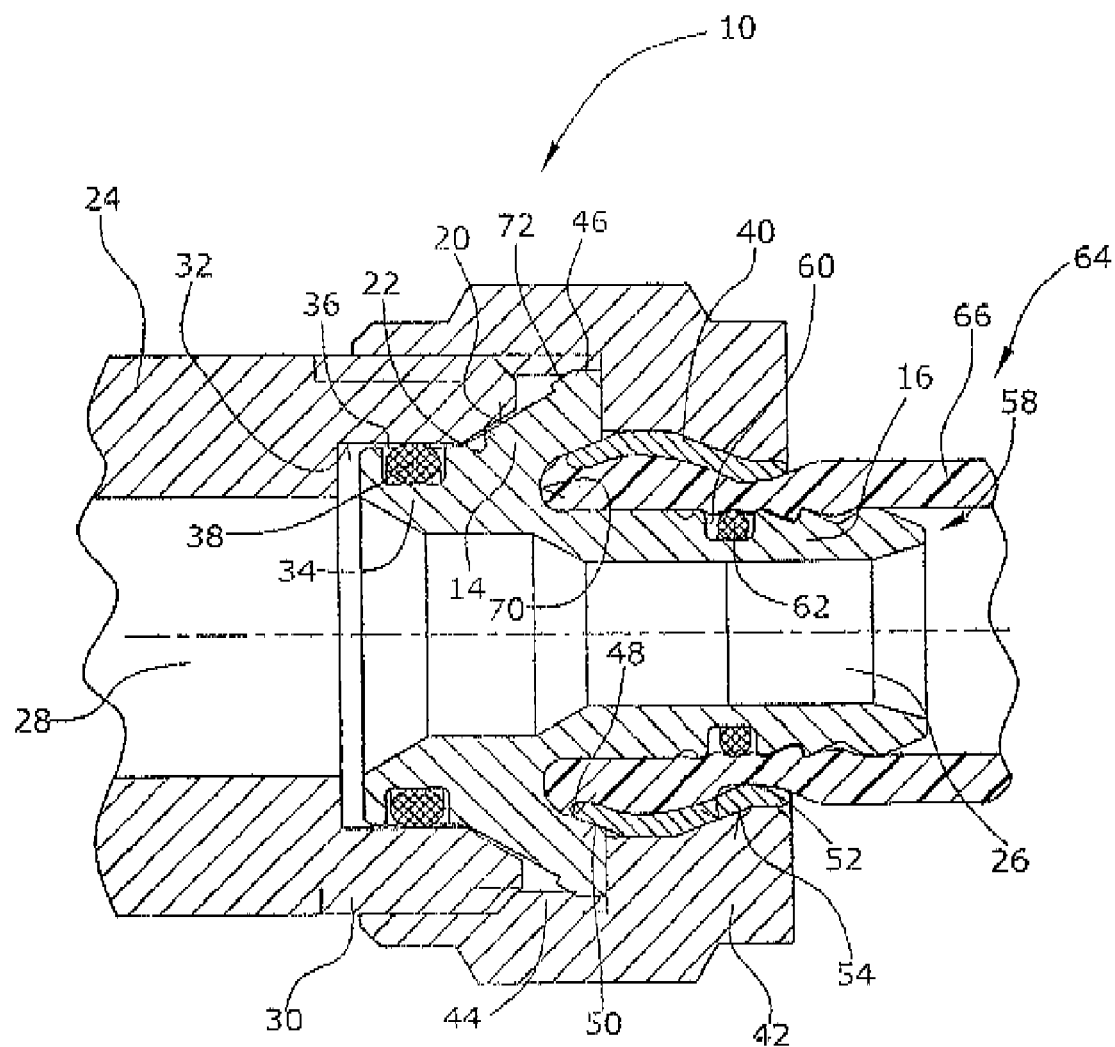

The invention will be explained in greater detail hereunder with reference to the drawings. The drawings illustrate the following:

FIG. 1 shows the initial situation prior to connecting the pipe end to the compression fitting, the components of the compression fitting being partially shown in the preassembled condition, FIG. 2 shows the situation during the mounting, where the pipe end which is to be connected has already been inserted into the intermediate space between the clamping ring and the supporting sleeve of the fitting body, FIG. 3 shows the condition of the fitting body at the start of the process of screwing the lock nut to the complementary part for the fitting body, and FIG. 4 shows the situation where the compression fitting has been fully screwed into place.

FIGS. 1 to 4 shows various sectional views of an embodiment of a compression fitting 10. As illustrated in FIG. 1, compression fitting 10 comprises a fitting body 12 which in the present embodiment is made of a (preferably highly temperature-resistant) plastic material, particularly a fiber-reinforced plastic material, and which is provided with a conically widened collar 14; collar 14 has arranged therein a supporting sleeve 16 configured concentrically therewith and axially extending beyond the end 18 of collar 14. The outer face of collar 14 is conical and forms an abutment face 20 by which the fitting body 12 is in abutment on a likewise conical receiving face 22 of a fitting-body complementary part 24. The fitting body 12 and the complementary part 24 are each provided with fluid passages 26,28. Further, the complementary part 24, which e.g. is made of metal, is formed with an external thread 30 on that end thereof which is provided with the receiving face 22. The receiving face 22 of complementary part 24 is joined by a cylindrical sealing face 32 adapted for sealing engagement with an extension 34 joining the conical abutment face 20 of fitting body 12. In the region of extension 34, fitting body 12 comprises a radially open circumferential groove 36 accommodating a sealing element 38 of elastomeric material. Around the supporting sleeve 16 of fitting body 12, a clamping ring 40 is arranged which in the present embodiment is made of plastic and particularly of fiber-reinforced and highly temperature-resistant plastic. The clamping ring 40 can be of closed or slitted shape. Fitting body 12 and clamping ring 40 are located in a lock nut 42 which is preferably made of metal and is formed with an inner thread 44 adapted for threaded engagement with the outer thread 30 of complementary part 24. Arranged around the circumference of the fitting body 12 in the region of collar end 18 thereof are projections 46 pointing in radially outward directions and clampingly cooperating with the inner thread 44 to the effect that the fitting body 12, once it has been inserted into the lock nut 42 for the first time, will be held therein. Therefore, fitting body 12 and clamping ring 40 can be pre-assembled together with lock nut 42 and can be handled as a unit, thus facilitating the transportation and the assembly process of the compression fitting 10.

As can be seen from FIG. 1, clamping ring 40 has a substantially trapezoidal cross-sectional face and is provided with a first oblique surface 50 abutting the inner face 48 of fitting-body collar 14 and with a second oblique surface 54 abutting a conical inner surface 52 of lock nut 42. In the rest of its outer circumferential region, clamping ring 40 is in abutment with the interior of lock nut 42. The conical face 52 of lock nut 42 merges into the passage 56 of lock nut 42. Arranged to extend concentrically through this opening 56 is the axial end 58 of supporting sleeve 16 facing away from fitting-body collar 14, with the supporting sleeve 16 being provided with a radially outward circumferential groove 60 accommodating an annular sealing element 62 of an elastomeric material (e.g. rubber).

On the right-hand side of FIG. 4, there is shown the (connection) end 64 of a pipe 66, which pipe in the present embodiment is made of plastic.

For connecting the pipe 66, the pipe will be inserted through the passage 56 into the intermediate space 68 between supporting sleeve 15 and clamping ring 40 until abutting on the ground 70 of the receiving space defined by fitting-body collar 14 and supporting sleeve 16. Thereafter, lock nut 42 will be screwed onto complementary part 24. This screw connection can already have been partially carried out before the pipe 64 is inserted into clamping ring 40 through the opening 56 of lock nut 42.

In the process of screw-fitting the lock nut 42 to the complementary part 24, there is then reached the situation according to FIG. 3 in which the conical inner face 52 of lock nut 42 and the also conical inner face 48 of fitting-body collar 14 will slightly bear against the corresponding oblique faces 54 and 50 on the outer side of clamping ring 40. During the further advancement of the screw engagement of lock nut 42, the clamping ring 40 will now via its oblique faces be pressed radially from the outside against supporting sleeve 16. In the process, clamping ring 40 will be deformed as shown e.g. in FIG. 4, so that the region of the passage 56 of lock nut 42 and particularly the region of the conical face 54 of lock nut 42 will be entered by material of clamping ring 40 which will render the opening 56 narrower while partially displacing the material of pipe 64, thus effecting a reliable seat of the pipe end 66 within compression fitting 10 and a reliable sealing of pipe 64 relative to supporting sleeve 16.

As further evident from the Figures, the fixing projections 46 of fitting body 12 are configured to extend into the conical abutment face 20 thereof. In this region, the projections function as centering and abutment projections 72, respectively, provided to prevent a too deep immersion of fitting body 12 into complementary part 24 if the cone angle of the receiving face 22 of complementary part 24 is larger than the cone angle of the abutment face 20 of fitting body 12. This situation is not illustrated in the Figures.

The invention claimed is:

1. A compression fitting for a heating and/or sanitary pipe, comprising
   a fitting body comprising a supporting sleeve adapted to have a pipe end slid thereonto, and a conical abutment face,
   a complementary part for the fitting body, which is provided with a conical receiving face for abutment by the abutment face of the fitting body,
   a clamping ring encompassing the pipe end which can be slid on the supporting sleeve, and
   a lock nut having an inner thread and being adapted to be screwed to the complementary part, for pressing the clamping ring against the fitting body and for clamping abutment on the pipe end in the condition when the pipe end has been slid onto the supporting sleeve,
   characterized in
   that the fitting body comprises radially protruding fixing projections for axially fixing the fitting body inside the lock nut to the inner thread or to other internal face structures thereof, to prevent the lock nut from being inadvertently detached before it is screwed to the complementary part.

2. The compression fitting according to claim 1, characterized in that the conical abutment face of the fitting body comprises centering and/or abutment projections for adaptation to the complementary part whose receiving face has a cone angle deviating from the cone angle of the abutment face.

3. The compression fitting according to claim 1, characterized in that the lock nut and the fitting body comprise conical press-on faces configured to cooperate with oblique faces on the axial ends of the clamping ring and that the cone angle of the press-on face of the fitting body is smaller than that of the press-on face of the lock nut.

4. The compression fitting according to claim 1, characterized in that the fitting body and/or the clamping ring comprise a plastic material.

5. The compression fitting according to claim 4, characterized in that the fitting body and/or the clamping ring include a fiber reinforcement.

6. The compression fitting according to claim 1, characterized in that the supporting sleeve is formed with at least one circumferential groove accommodating a sealing element therein for sealing abutment on the inner face of the pipe end.

7. The compression fitting according to claim 1, wherein the fitting body comprises a tapered cone end that is formed with a circumferential groove accommodating a sealing element therein for sealing abutment on the inner face of the complementary part.

\* \* \* \* \*

UNITED STATES PATENT AND TRADEMARK OFFICE
CERTIFICATE OF CORRECTION

PATENT NO.         : 7,644,958 B2
APPLICATION NO.    : 11/914423
DATED              : January 12, 2010
INVENTOR(S)        : Stefan Postler It is certified that error appears in the above-identified patent and that said Letters Patent is hereby corrected as shown below:

In the Specification

Col. 3, Line 37: "supporting sleeve 16" should be --supporting sleeve 15--

Signed and Sealed this
Twentieth Day of August, 2013

Teresa Stanek Rea
*Acting Director of the United States Patent and Trademark Office*